US011700558B1

(12) United States Patent
Bharadwaj et al.

(10) Patent No.: US 11,700,558 B1
(45) Date of Patent: Jul. 11, 2023

(54) HANDOVER REDUCTION IN SATELLITE COMMUNICATION SYSTEMS

(71) Applicant: Hughes Network Systems, LLC, Germantown, MD (US)

(72) Inventors: Gautham Bharadwaj, Ashburn, VA (US); Subramanya Bayar Krishna, Rockville, MD (US); Deepak Manohar Arur, Vienna, VA (US); Channasandra Ravishankar, Clarksburg, MD (US); Charles A. Barnett, Leesburg, VA (US)

(73) Assignee: Hughes Network Systems, LLC, Germantown, MD (US)

( * ) Notice: Subject to any disclaimer, the term of this patent is extended or adjusted under 35 U.S.C. 154(b) by 15 days.

(21) Appl. No.: 17/563,801

(22) Filed: Dec. 28, 2021

(51) Int. Cl.
H04W 36/00 (2009.01)
H04W 84/06 (2009.01)

(52) U.S. Cl.
CPC . H04W 36/00837 (2018.08); H04W 36/0072 (2013.01); H04W 36/0077 (2013.01); H04W 84/06 (2013.01)

(58) Field of Classification Search
None
See application file for complete search history.

(56) References Cited

U.S. PATENT DOCUMENTS

| 6,512,920 | B1 * | 1/2003 | Yaoya | H04B 7/18541 455/427 |
| 11,032,751 | B2 | 6/2021 | Arur et al. | |
| 2014/0274053 | A1 * | 9/2014 | Latva-Aho | H04W 36/24 455/436 |
| 2018/0083672 | A1 * | 3/2018 | Alexander | H04B 7/024 |
| 2019/0230568 | A1 * | 7/2019 | Arur | H04B 7/2041 |
| 2022/0264406 | A1 * | 8/2022 | Sun | H04B 7/18513 |
| 2022/0294518 | A1 * | 9/2022 | Hsieh | H04B 7/18515 |

FOREIGN PATENT DOCUMENTS

| WO | 2015/191138 A2 | 12/2015 |
| WO | 2017/189862 A1 | 11/2017 |
| WO | WO-2022090610 A1 * | 5/2022 |

OTHER PUBLICATIONS

"Search Report and Written Opinion, PCT Application No. PCT/US2021/065376", dated Oct. 4, 2022, 13 pages.

* cited by examiner

Primary Examiner — Kenny S Lin
(74) Attorney, Agent, or Firm — Mannava & Kang, PC; George Y. Wang

(57) ABSTRACT

Systems and methods for facilitating handover reduction in satellite systems are disclosed. A system may include a processor and a memory storing instructions, which when executed by the processor, may cause the processor to detect a user terminal that is selected for a handover procedure. The handover procedure may facilitate a switch from a source beam to a target beam. Based on input data, the processor may evaluate an ideal time value pertaining to a pre-defined time instance at which a scheduled handover is to be performed. The scheduled handover may correspond to at least one of a scheduled change in operating frequency within same beam or a scheduled feeder link handover due to a change in gateway communicating with the satellite. Based on the evaluation and the input data, the processor may estimate an optimized time value that pertains to an optimized time instance associated with an expected handover reduction.

20 Claims, 6 Drawing Sheets

HANDOVER REDUCTION IN SATELLITE COMMUNICATION SYSTEMS

TECHNICAL FIELD

This patent application is directed to satellite communication systems and, more specifically, to systems and methods for facilitating reduction in the number of handovers in a satellite communication system.

BACKGROUND

In satellite systems that utilize multiple radio beams (or cells) to provide a service over an extended geographic area, a terminal (user terminal) located in the service area may receive signals from one or more beams associated with the same or different satellites. To maintain signal connectivity of the terminal, a handover procedure is usually followed in order to properly enable the terminal to be switched from one beam (source beam) to another beam (target beam). As beams may be moving relative to a terminal, signal strength(s) of the beams as seen by the terminal may vary with time as its position may change relative to a center of a beam to a corresponding edge and into a next beam. In other words, when there is a relative motion between the terminal and the beam, the selection of target beams and the corresponding handover may be needed to be performed frequently. However, handovers may be error-prone and disruptive to service or overall connectivity.

For example, in certain satellite systems (e.g., geosynchronous orbit (GEO) satellite systems), switching between beams may occur at a rate that is in the order of hours to few minutes, depending on the beam size and the speed of the terminal. In some cases, handovers may be required as often as every few seconds, such as in non-geostationary (NGSO) systems mainly due to high speed with which the beam footprint moves over the ground, such as, for example, 6 km/sec or 21,600 km/hr fora Low Earth Orbital (LEO) satellite at 1200 km altitude.

This higher rate of handovers may incur a signaling overhead both at the gateway and over the air. This load increases significantly when the ideal handover times are in rapid succession especially when one of the handovers is a scheduled handover resulting from, a change in operating frequency of a beam covering the User Terminal (UT) or a satellite switching its feeder link from one gateway to another and the other handover is due to relative motion of the beams and the User Terminal. Multiple consecutive handovers increases signaling overhead and causes prolonged interruption thereby reducing actual end-user application throughputs.

BRIEF DESCRIPTION OF DRAWINGS

Features of the systems and methods are illustrated by way of example and not limited in the following Figure(s), in which like numerals indicate like elements, in which.

DETAILED DESCRIPTION

Figure 1:
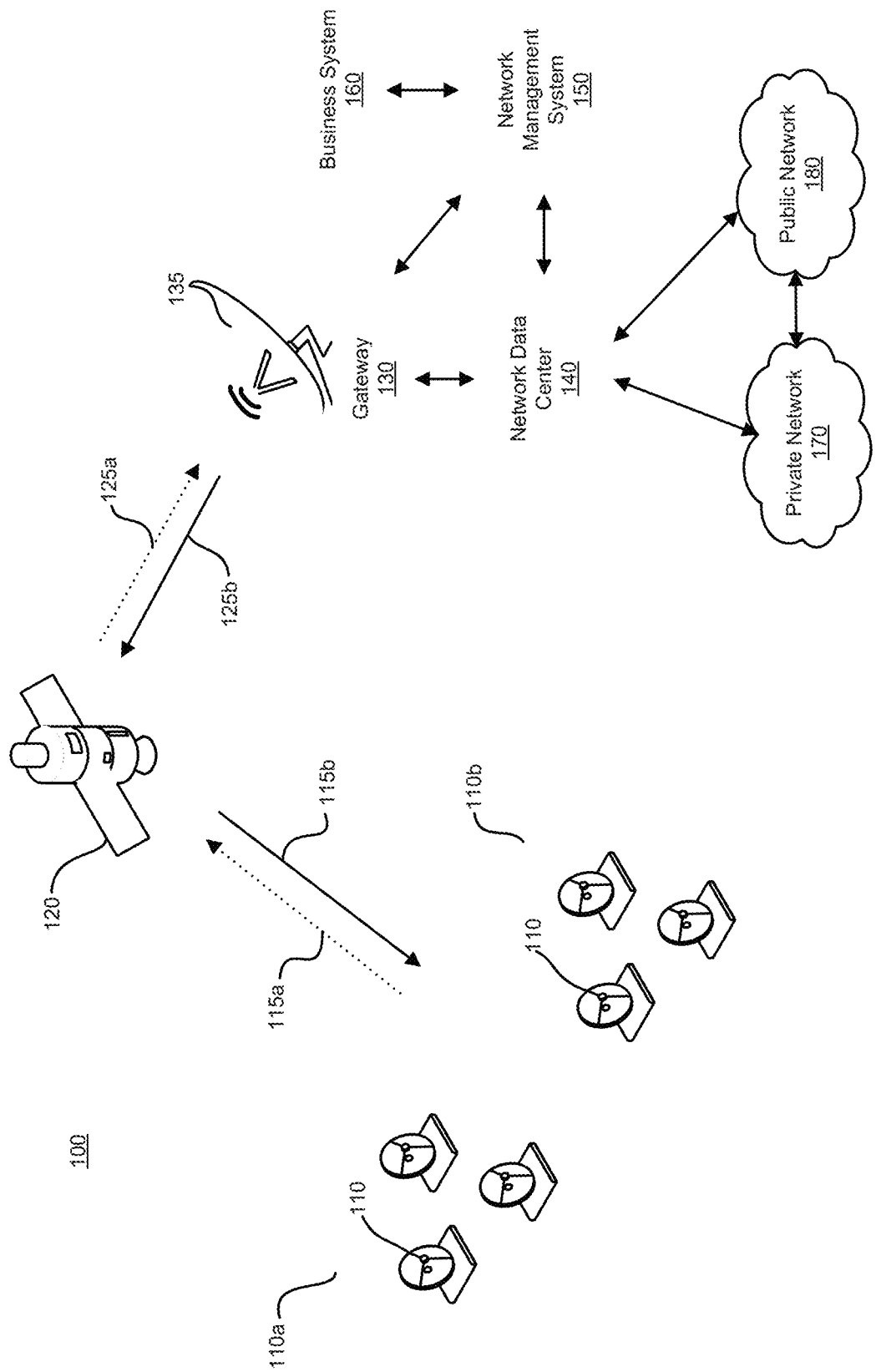
FIG. 1 illustrates a system for facilitating handover reduction in a satellite system, according to an example.

For simplicity and illustrative purposes, the present systems and methods are described by referring mainly to examples and embodiments thereof. In the following description, numerous specific details are set forth in order to provide a thorough understanding of the systems and methods described herein. It will be readily apparent, however, that the systems and methods may be practiced without limitation to these specific details. In other instances, some methods and structures readily understood by one of ordinary skill in the art have not been described in detail so as not to unnecessarily obscure the systems and methods described herein. As used herein, the terms "a" and "an" are intended to denote at least one of a particular element, the term "includes" means includes but not limited to, the term "including" means including but not limited to, and the term "based on" means based at least in part on.

As described above, a handover procedure may enable a terminal to be switched from one beam (source beam) to another beam (target beam). However, handovers may be required as often as every few seconds and may occur in rapid succession especially when one of the handover is a scheduled handover. As mentioned above, this may result from frequency change within a beam or a satellite switching its feeder link from one gateway to another.

Some systems may include predictive handover techniques that use information on satellite ephemeris and beam activation schedules. However, such predictive techniques may be able to only estimate the best quality radio beam available and/or best ideal time for handover, which may not always lead to reduction in the total number of handovers and hence may not effectively reduce the signaling overhead.

It should be appreciated that in order to maintain signal connectivity of a user terminal (hereinafter also interchangeably referred to as terminal or UT), a procedure for a predicted handover based on the relative motion between the beams and the UT may be performed from one beam (such as source beam) to another beam (such as target beam). However, such a handover may be immediately followed or preceded by a scheduled handover such as frequency or feeder link handover as described below. Thus, a scheduled handover and predicted handover occurring in rapid succession to one another may lead to additional signaling immediately after signaling resources were spent for a handover.

Further, even in case of predicted beam handovers (due to the relative motion of the beams and the UT), there may be multiple consecutive handovers from source beam to target beam via switching to one or more intermediate beams. However, switching to the intermediate beam may be non-essential at times, especially when an intermediate beam may be very close to target beam.

The normal rate of predicted handovers in different satellite systems is as shown in the Table 1 below. However, in either of the scenarios described above, such handovers may add to the latency and delay, as a large number of terminals may be switched at a given time. In general, higher rate of handovers may incur a signaling overhead both at gateway and over the air. This load increases significantly when ideal handover times are in rapid succession, in the order of milliseconds to seconds.

TABLE 1

Examples of Handover Rates in Different Systems

| System Type | Beam/Cell Size, km | Relative Ground Speed, km/hr | Time Between Handovers |
| --- | --- | --- | --- |
| Terrestrial Cellular, vehicular UT | 10 | 100 | 6 min |
| GEO spot beam, vehicular UT | 500 | 100 | 5 hr |
| GEO spot beam, aeronautical UT | 500 | 1,000 | 30 min |
| LEO spot beam, stationary or mobile UT 1 (This is for LEO systems with "satellite fixed beam" configuration where beam footprint on the ground moves with the satellite) | 70 | 22,000 | 11 sec |

Therefore, the handover procedures may require handling in such a way that can prevent delay due to processing/latency, while maintaining signal connectivity when switching a large number of terminals at a given time. Multiple consecutive handovers increases signaling overhead and causes prolonged interruption thereby reducing actual end-user application throughputs. Thus, reducing the number of handovers, which may be error-prone and disruptive to service or overall connectivity, may be highly desirable in satellite communications systems.

The systems and methods described herein, provides an effective approach to reduce the number of handovers in a satellite system by either evading the need for scheduled handovers and/or by preventing the handover to the intermediate beams (in case of multiple consecutive handovers). The systems and methods may realize that, at any time instance, by processing prior information related to factors, for example, available radio beams to which terminals may be switched, the ideal time to execute the handovers, predicted signal strength, link availability, or other such data, an optimized time value may be derived. The optimized time instance may pertain to an optimized time value corresponding to an expected handover reduction such that if the handover may be performed at the optimized time instance instead of the ideal time, the number of handovers may be relatively reduced. This may lead to several advantages such as reduction in peak signaling processing load, reduced latency at gateway, reduction in radio resource overhead associated with signaling over air, shorter and less frequent interruptions in service otherwise present in case of frequent handovers. Several other advantages may be realized.

FIG. 1 illustrates a system for facilitating handover reduction in a satellite system, according to an example. In some examples, the system 100 may depict a satellite 120 that may use one or more radio beams (hereinafter also interchangeably referred to beam or beams) to provide service over an extended geographic area to at least one user terminal 110 (hereinafter also interchangeably referred to as terminal 110 or UT 110). The user terminal 110 may be able to receive the service through connectivity to the one or more radio beams associated with same or different satellites 120 in same orbital plane or a different orbital plane. The satellite communication system may be capable of providing at least voice and/or data services. In some examples, the satellite communication system may include the satellite 120 that relays signal to the at least one terminal 110 from a gateway 130. In some examples, the systems and methods described herein may be applicable to non-geostationary (NGSO) satellites, wherein beams may move predictably due to satellite motion, although it should be appreciated that the examples herein may not be limited only to NGSO constellations. In some examples, the system 100 may include any number of user terminals 110, satellite 120, gateway 130, a network data center 140, a network management system (NMS) 150, a business system 160, or other various system elements or components. The system 100 may also include a private network 170 and/or public network 180. It should be appreciated that the system 100 depicted in FIG. 1 may be an example. Thus, the system 100 may or may not include additional features and some of the features described herein may be removed and/or modified without departing from the scopes of the system 100 outlined herein.

The user terminals 110 may be any variety of terminals. For example, the user terminals 110 may be customer terminals, such as very small aperture terminals (VSATs). It should be appreciated that VSATs may be terminals that are mounted on a structure, habitat, or other object or location. Depending on application, the user terminals 110 may include or incorporate any number of antenna types (such as fixed or scanning aperture, either mechanically and/or electrically steered) and antenna sizes. Although the terminals 110 may typically remain in the same location once mounted, the terminals 110 may be removed from their mounts, relocated to another location, and/or may be configured to be mobile terminals. For instance, the terminals 110 may be mounted on mobile platforms that facilitate transportation thereof from one location to another. Such mobile platforms may include, for example, any number of mobile vehicles, such as cars, buses, boats, planes, etc. It should be appreciated that such terminals 110 may generally be operational when still and not while being transported. There may be scenarios where the terminals 110 may be transportable (mobile) terminals that remain operational during transit. As used herein, the terms "terminal," "customer terminal," "satellite terminal," and/or "VSAT" may be used interchangeably to refer to these terminal types.

It should be appreciated that any number of customer premise equipment (CPE) (not shown) may be communicatively coupled to the terminals 110. In some examples, the customer premise equipment (CPE) may include any number of computing or mobile devices. For example, such a computing or mobile device may include a laptop, a tablet, a mobile phone, an appliance, a camera, a sensor, a thermostat, a vehicle, a display, etc. In general, the customer premise equipment (CPE) may include, without limitation, any number of network-enabled computing devices, elements, or systems. It should be appreciated that a network of such devices may be commonly referred to as the "Internet of Things" (IoT).

As shown in FIG. 1, there may be different types of terminals or a plurality of groups of terminals 110 (e.g., customer VSATs). For example, each terminal such as 110A, 110B (collectively referred to as terminal or terminals 110) may pertain to an individual terminal or plurality of groups. In some examples, the terminal 110A may be terminal(s) located in a similar geographic location than the terminal(s) 110B. The satellite 120 may be an object intentionally placed into orbit. In some examples, the satellite 120 may be an artificial satellite that is configured to transmit and receive data signals. For example, the satellite 120 may form the one or more radio beams and provide connectivity between at least the terminals 110 and the gateway 130. More specifically, the satellite 120 may communicate data signals using these beams with the terminals 110 and with the gateway 130. It should be appreciated that the satellite 120 may form any number of beams to communicate data signals with any number of components, in same or different orbital plane. In some examples, the satellite 120 may be a NGSO communication satellite. The satellite 120 may be in geosynchronous (GEO) orbit, low earth orbit (LEO) or mid earth orbit (MEO) satellite. The link conditions may vary more rapidly for LEO and MEO systems as the propagation path may be longer or shorter depending on the satellite location and different atmospheric/weather conditions encountered. In some examples, the satellite 120 may include, but not limited to, a transponder satellite, a regenerative satellite, and/or other similar satellite.

The gateway 130 may include or be communicatively coupled to a transceiver 135, such as a radio frequency transceiver (RFT). The transceiver 135 may include an antenna unit of any type (e.g., transmitter, receiver, communication element, etc.), which may transmit and receive signals. In some examples, the transceiver 135 may be useable, by the gateway 130 of system 100, to transmit and receive data from the terminals 110, via communications from the satellite 120, and may be configured to route data and traffic from these terminals 110 to any other element or component in the system 100, such as the network data center 140 and/or network management system (NMS) 150. The gateway 130 may be further configured to route traffic to and from the public network 180 and/or private network 170 across the satellite communication channels 115a, 115b, 125a, 125b to any terminal 110, which would then provide data communications or route traffic to any customer premise equipment (CPE) (not shown) associated with the terminal 110. It should be appreciated that to perform the handover procedure (single or multiple consecutive handovers), each terminal 110 (or a group of terminals such as 110A, 110B) may switch between two radio beams pertaining to same or different NGSO satellites, which may be in same orbital plane or in different orbital planes. Although depicted as a single element, the gateway 130 may include a single gateway, multiple gateways residing locally or remotely, in full or in part, relative to the other system components. As described in more detail below, the gateway 130, the network data center 140, and/or the network management systems (NMS) 150 may provide operations pertaining to the handover procedure.

The system may include a processor (e.g., a computer processing unit (CPU), etc.), a data store and other such elements. In some examples, the system may be implemented in the gateway 130. The processor may include also various configurations including, without limitations, a personal computer, laptop, server, and other elements. The data store may be used, for example, to store and provide access to information pertaining to various operations of and in the system 100. Although depicted as a single element, the processor and/or the data store may be configured as a single element, multiple elements, or an array of elements. For example, the gateway 130 may include any number of processors and/or data stores in order to accommodate the needs of a particular system implementation. Various examples may further provide for redundant paths for components of the gateway 130. These redundant paths may be associated with backup components capable of being seamlessly or quickly switched in the event of a failure or critical fault of any primary component.

In some examples, the systems and methods described herein, may enable reduction in the number of handovers. The system may include a memory storing instructions, which when executed by the processor, cause the processor to perform one or more functions for handover reduction. The processor may detect, from plurality of user terminals, a user terminal 110 that is scheduled for a handover procedure for maintaining signal connectivity to a radio beam of a plurality of radio beams corresponding to at least one satellite. The handover procedure may facilitate to switch the signal connectivity of the user terminal 110 from a source beam to a target beam of the plurality of radio beams. Further, based on input data, the processor may evaluate an ideal time value pertaining to a pre-defined time instance at which a scheduled handover is to be performed. The scheduled handover may correspond to at least one of a frequency or feeder link handover within the source beam and or the target beam. A predicted handover, for example, may correspond to handover between two beams of the same satellite or two beams belonging to different satellites, providing overlapping coverage to the UT with comparable (or equal) signal level as perceived by the UT, due to the relative motion between the beams and the UT. Based on the evaluation and the input data, the processor may estimate an optimized time value pertaining to an optimized time instance. The optimized time instance may correspond to an expected handover reduction. The expected handover reduction may lead to an estimated decrease in the number of handovers in the handover procedure such that the expected handover reduction at the optimized time instance executes an optimized beam handover without the need to execute the scheduled frequency handover.

It should be appreciated that the systems and methods described herein may be an improvement in over the handover prediction systems and methods described in U.S. Patent Publication No. 2019/0230568, entitled "User Terminal Handover Prediction in Wireless Communications Systems with Nonstationary Communications Platforms," which is incorporated by reference in its entirety. As such, a similar gateway implementation model may apply here as well. For example, this may include hardware and/or software components and algorithms that receive and process satellite ephemeris data, satellite contact plans, satellite antenna directivity pattern data, user terminal position, individual user terminal signaling state information, system link budget models, etc.

In some examples, the source beam and the target beam may pertain to same or different satellites that may be same or different orbital planes. The source beam may refer to a radio beam that provides signal present connectivity to the terminal 110, and the target beam may be a radio beam intended for switching to, in a handover procedure. In some examples, the input data may include information pertaining to the available radio beams of the plurality of radio beams for maintaining the signal connectivity of the user terminal. In some examples, the processor may receive the input data prior to an upcoming scheduled handover and may facilitate the handover procedure at the optimized time value to reduce the number of handovers. In some examples, the input data may include at least one of an ideal time value pertaining to the scheduled handover, information pertaining to the frequency handover, information pertaining to the beam handover, pre-determined strength of the signal connectivity at the user terminal, or availability of the plurality of radio beams.

Referring to FIG. 1, the network data center 140 may be communicatively coupled to the gateway 130, as well as other system components, such as the network management system (NMS) 150, private network 170, and/or public network 180. In some examples, the network data center 140 may be a satellite network data center that is configured to perform one or more operations pertaining to the handover procedure. In some examples, the network data center 140 may include a plurality of network data centers that are local or remote, in full or in part, relative to the other system components.

The network management system (NMS) 150, maintains, in full or in part, various information (configuration, processing, management, etc.) for the gateway 130, and terminals 110 and beams supported by the gateway 130. It should be appreciated that the network management system (NMS) 150 may or may not be co-located within the same physical structure as the gateway 130. Furthermore, the network management system (NMS) 150 may be single or a plurality distributed components that may be communicatively coupled to each other and/or with other system elements, such as the gateway 130 (e.g., using the previously described hardware and external networks). The network management system (NMS) 150 may, among other things, include a configuration manager or other similar management unit.

The business system 160, or other various system elements or components, may also be communicatively coupled to the network management system (NMS) 150 and/or gateway 130. In some examples, the business system 160 may include a virtual network operator (VNO), which may be configured to communicate with the gateway 130 and/or the network management system (NMS) 150 in order to perform the handover reduction. More particularly, a virtual network operator (VNO), in some scenarios, may be a business or government entity, that may have access (by purchase or license) to a managed service and associated capacity from a satellite network operator in order to provide communication connectivity and/or communication for a privately-owned set of terminals 110. The virtual network operator (VNO) may therefore manage various aspects of such terminals 110 via the gateway 130 and/or the network management system (NMS) 150.

The private network 170 and/or public network 180 may include any variety of networks. For example, the private network 170 may be a local area network (LAN), and the public network 180 may be a wide area network (WAN). That said, the private network 170 and/or public network 180 may each also be a local area network (LAN), wide area network (WAN), the Internet, a cellular network, a cable network, a satellite network, or other network that facilitates communication between the components of system 100-1 as well as any external element or system connected to the private network 170 and/or public network 180. The private network 170 and/or public network 180 may further include one, or any number, of the exemplary types of networks mentioned above operating as a stand-alone network or in cooperation with each other. For example, the private network 170 and/or public network 180 may utilize one or more protocols of one or more clients or servers to which they are communicatively coupled. The private network 170 and/or public network 180 may facilitate transmission of data according to a transmission protocol of any of the devices and/or systems in the private network 170 and/or public network 180. Although each of the private network 170 and/or public network 180 is depicted as a single network in FIG. 1, it should be appreciated that in some examples, each of the private network 170 and/or public network 180 may include a plurality of interconnected networks as well.

While the processors, components, elements, systems, subsystems, and/or other computing devices may be shown as single components or elements, one of ordinary skill in the art would recognize that these single components or elements may represent multiple components or elements, and that these components or elements may be connected via one or more networks. Also, middleware (not shown) may be included with any of the elements or components described herein. The middleware may include software hosted by one or more servers. Furthermore, it should be appreciated that some of the middleware or servers may or may not be needed to achieve functionality. Other types of servers, middleware, systems, platforms, and applications not shown may also be provided at the front-end or back-end to facilitate the features and functionalities of the system 100 and their components, as shown in FIG. 1.

In an example, the system may enable reduction of handovers by preventing the need to perform scheduled handovers. In alternate example, the system may enable reduction of handovers by reducing the number of beam handovers in multiple consecutive handovers such that switching to intermediate beams may be avoided. In some examples, it may be observed that the advantage of the optimized beam handover may be significant when one of the handovers is a scheduled handover such that plurality of user terminals may be in the same source beam and may be required to be handed over at the same time. For example, to quantify the same, it may be assumed that a beam supports 10000 user terminals that may be uniformly distributed and an average time spent by a user terminal in a beam may be 10 seconds. In this particular example, the number of users experiencing scheduled handovers and unscheduled handover in 1 second may be (10000/10)=1000. By combining these two successive handovers, the peak signaling load can be reduced by (1000/(10000+1000))*100=9.09%. In some examples especially pertaining to frequency handover reduction, to select the best beam to serve the UT, the system or processor may perform, based on a pre-determined factor, the handover procedure involving at least one of a time advancement or a time delay with respect to the pre-defined time instance at which the scheduled handover is required to be performed.

In an example, the input data may include a known information pertaining to the available radio beams of the plurality of radio beams for maintaining the signal connectivity of the user terminal. The input data may include at least one of a real time information and a pre-stored information. In an example, the system may receive the pre-stored information prior to an upcoming scheduled handover and may facilitate the handover procedure at the optimized time value to reduce the number of handovers. The input data may pertain to at least one of an ideal time value pertaining to the scheduled handover, information pertaining to the frequency handover, information pertaining to the beam handover, pre-determined strength of the signal connectivity at the user terminal, or availability of the plurality of radio beams. For example, the input data may be in form of previously computed information or pre-stored information pertaining to handover procedure performed in the past. In another example, the input data may be any real-time information, for example, the availability of beams for switching, system failures, poor signal quality of the beams, and other such information. The real-time information may also include data obtained from a path selection algorithm/predictive algorithm, which may be used to evaluate the ideal time value.

In an example, one or more real time conditions may affect the prediction of sequence of beams to which the terminal may be switched. In some examples, the systems and methods described herein may eliminate a few beams from consideration based on certain aspects/input data. One aspect/input data may include a prior knowledge pertaining to radio link failures as experienced by other terminals when handed over to corresponding beams. This may be likely due to some impairments at the satellite causing signal strength on the service link to drop. Another aspect/input data may pertain to any knowledge of a failure detected at network device/gateway elements responsible for facilitating communication over the air interface at the satellite and or beam level which would otherwise lead to the terminal experiencing radio link failure when handed over to the beam. In some examples, due to the sharp roll off of beam gain in the direction of movement of the satellite, the beam crossover point may be sensitive to altitude errors, for example, with respect to satellite in-track position and pitch angle. The effect of these errors on shift in the ideal beam handover point may be mitigated at the gateway by periodic measurements from the terminal to estimate the beam roll off. Several other types of such input data/aspect based on system failures, poor link quality and other aspects may be considered by the system in avoiding handover to the corresponding faulty systems/beams.

Figure 2A:
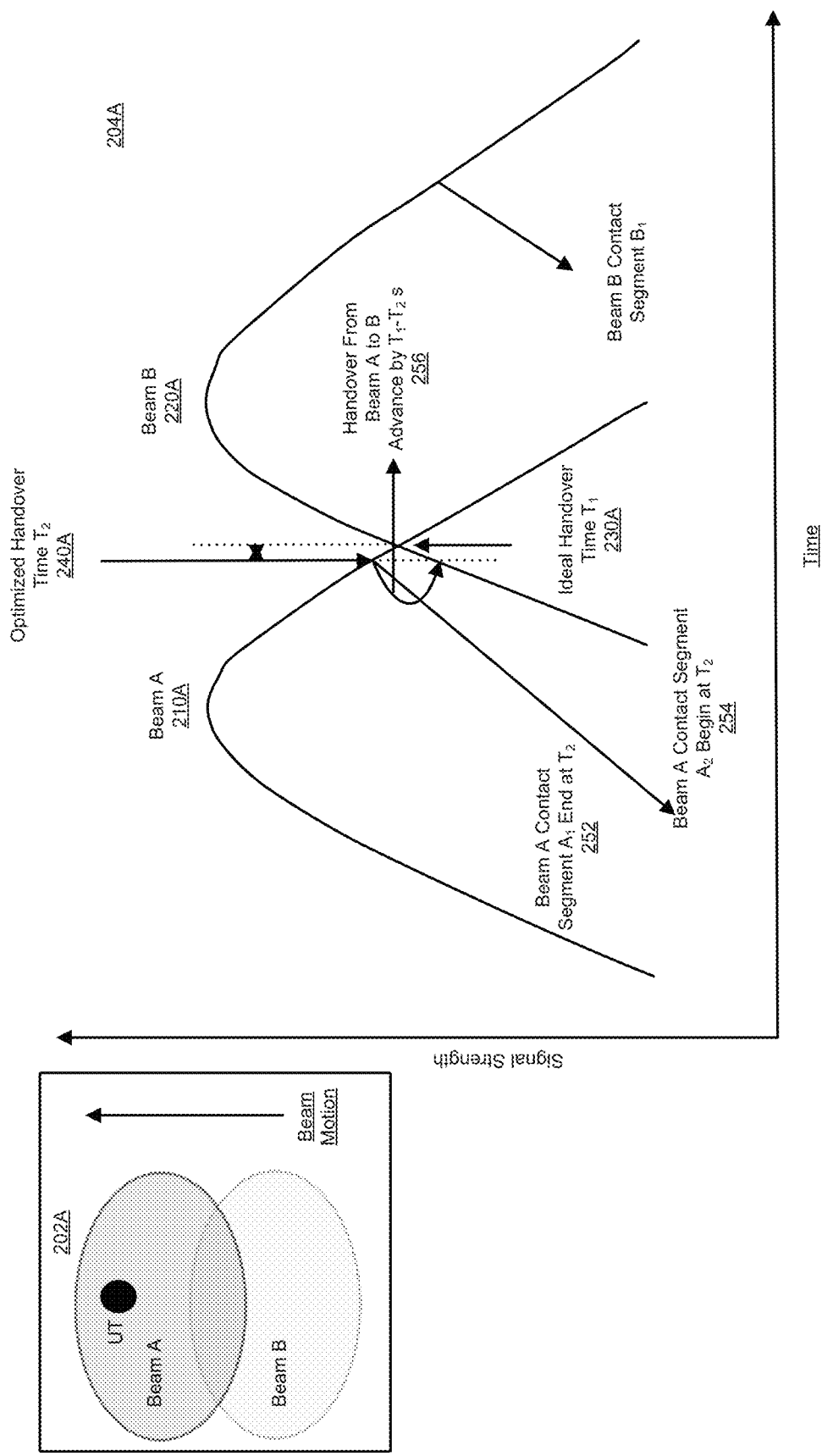
FIGS. 2A-2C illustrate examples depicting various scenarios pertaining to handover reduction in a satellite system, according to an example.
Figure 2B:
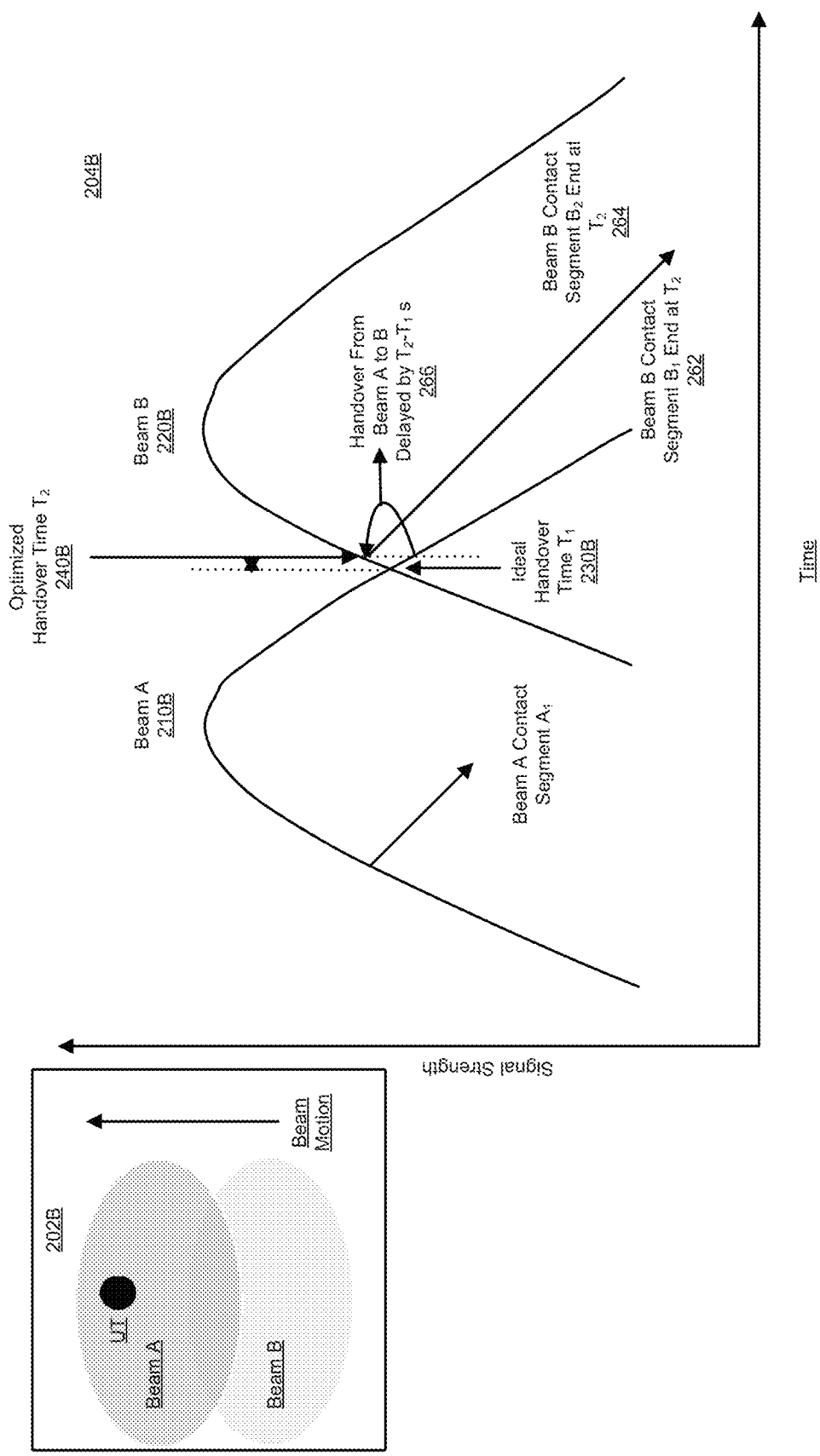
Figure 2C:
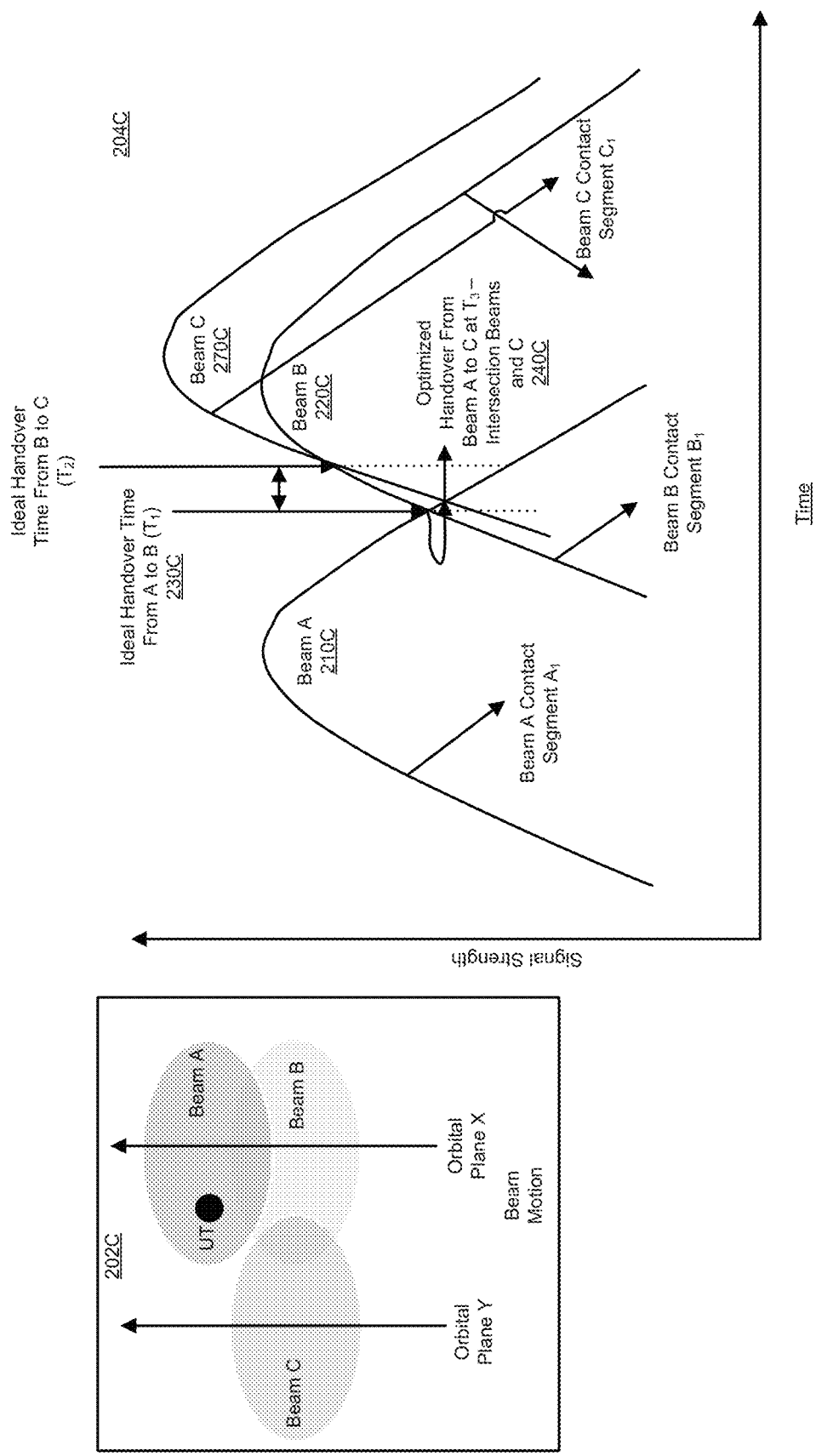

In some examples, the pre-determined factor may correspond to at least one of two crucial factors. These factors may pertain to time difference between the ideal time value or the optimized time value or an information pertaining to an active contact segment of at least one radio beam involved in the handover procedure. In some examples, the first crucial factor i.e. information pertaining to the radio beam may include an estimated active contact segment of source beam or the target beam involved in the handover procedure at the time of execution of the handover procedure. This means that to perform the handover at any given time, there may be a requirement of presence of an active contact segment available to perform the switching. In an example, the second crucial factor may require that the time difference between the ideal time value and the optimized time value may exceed a pre-defined threshold value for performing the optimized handover for expected handover reduction. In an alternate example, the expected handover reduction may not be performed if the time difference between the ideal time value and the optimized time value does not exceed a pre-defined threshold value. In some examples, the pre-defined threshold value may be represented as T and may pertain to lowest time value required for a signal to noise ratio (SNR) of the radio beam to drop by a configurable threshold. This may be significant to ensure that the quality of the signal does not drop below a certain required limit. In some examples, the configurable threshold may correspond to an expected tradeoff between a total processing time for one handover and temporary degradation in the SNR, based on requirements and characteristics of the scheduled handover. Thus, the configurable threshold may represent a balance or optimization between the processing time and signal quality. These aspects shall be clear from the below description pertaining to FIGS. 2A-2C that cover various example scenarios. As an example. If the beam gain roll-off rate around the ideal handover point is 1 dB/second and the allowable instantaneous degradation in link quality is 0.5 dB, then the time difference between the optimized and ideal handover times cannot exceed 0.5 second and T is 0.5 second FIGS. 2A through 2C illustrate examples depicting various scenarios pertaining to handover reduction in a satellite system, according to an example. FIGS. 2A and 2B mainly depict reduction in scheduled handover (preventing the need to execute scheduled handover) by time advancement and time delay respectively with respect to the pre-defined time instance at which the predicted handover is required to be performed. As depicted in FIG. 2A, the terminal or user terminal (UT) 110 may obtain signal connectivity from a satellite based on a source beam 210A. The system/processor may receive input data prior to an upcoming handover. For example, the input data may be in form of previously computed information or pre-stored information pertaining to handover procedure performed in the past and/or can be any real-time information, for example, the beams available for switching. In some examples, the input data may be derived from a path selection algorithm that may enable to evaluate the ideal time value pertaining to the pre-defined time instance at which the handover to a target beam 220A is to be performed. This means that typically, the terminal 110 should be switched from beam A (210A) to beam B (220A) at ideal handover time value $T_1$ (shown at 230A). However, if the handover may be performed at time $T_1$, then it may involve two handovers in total for switching from beam A (210A) to beam B (220A), wherein one handover may include the beam handover at time ideal time value $T_1$ (when signal strength of beam A (210A) and beam B(220A) as perceived by the UT are predicted to be equal). However, in addition, there may be a second additional handover, which is a scheduled handover that may be required to be performed before the predicted handover at $T_1$. The scheduled handover may pertain to changing operating frequency within the beam A (210A) or a change in feeder link resulting from change in the gateway communicating with the satellite. For example, the scheduled handover may pertain to an instance at which segment A1 of Beam A (210A) ends (i.e. as shown in 252) and segment A2 starts (i.e. as shown in 254) at time $T_2$. Thus, in conventional systems and methods, the handover described in this example may include total 2 handovers. However, using the systems and methods described herein, there is no need to execute the scheduled handover. This is achieved by performing the handover procedure by a time advancement with respect to the pre-defined time instance (or ideal time value $T_1$). This means that the system may estimate an optimized time value $T_2$ such that an optimized beam handover is performed at $T_2$ instead of performing the handover at the ideal handover as indicated at 256. The handover from beam A (210A) to beam B (220A) is thus advanced by time $(T_1-T_2)$ seconds. In some examples, the handover by time advancement is performed if the optimized time value is estimated to be less than the ideal time value. Further, the handover via time advancement may be performed based on a pre-determined factor. The pre-determined factor may correspond to at least one of a time difference between the ideal time value or the optimized time value and an information pertaining to an active contact segment of at least one radio beam involved in the handover procedure. For example, in reference to scenario described in FIG. 2A, the handover from beam A (210A) to beam B (220A) can be advanced to Time $T_2$, based on pre-determined factor i.e. If $(T_1-T_2)<T$ (pre-defined threshold as explained hereinabove) and the beam B (220A) has an active contact segment at Time $T_2$. Thus, the scheduled handover of the terminal within beam A (210A) at time $T_2$ (from segment $A_1$ to $A_2$) and associated signaling can be avoided.

In an alternate example, FIG. 2B may depict a second scenario involving reduction in scheduled handover (preventing the need to execute scheduled handover) by time delay with respect to the pre-defined time instance at which the handover is required to be performed. As depicted in FIG. 2B, the terminal or user terminal (UT) 110 may obtain signal connectivity from a satellite based on a source beam 210B. The system/processor may receive an input data prior to an upcoming scheduled handover. For example, the input data may be an information obtained from a path selection algorithm/predictive algorithm, which may be used to evaluate the ideal time value pertaining to the pre-defined time instance at which the scheduled handover to a target beam 220B is to be performed. This means that typically, the terminal 110 should be switched from beam A (210B) to beam B (220B) at ideal handover time value $T_1$ (as shown in 230B). However, if the handover may be performed at time $T_1$, then it may involve two handovers in total for switching from beam A (210B) to beam B (220B), wherein one handover may include the beam handover at time ideal time value $T_1$ (when signal strength of beam A (210B) and beam B (220B) as perceived by the UT are predicted to be equal). Additionally, there may be a second handover, which is a scheduled handover required to be performed after the beam handover at $T_1$. The scheduled handover may pertain to changing operating frequency within the beam B (220B) or a change in feeder link resulting from change in the gateway communicating with the satellite. For example, the scheduled handover may pertain to an instance at which segment B1 of Beam B (220B) ends (i.e. as shown in 262) and segment B2 starts (i.e. as shown in 264) at time $T_2$. Thus, in conventional systems and methods, the handover described in this example may include total 2 handovers. However, using the systems and methods described herein, there is no need to execute the scheduled handover. This is achieved by performing the handover procedure by a time delay with respect to the pre-defined time instance (or ideal time value $T_1$). This means that the system may estimate an optimized time value $T_2$ such that an optimized beam handover is performed at $T_2$ instead of performing the handover at the ideal handover time value $T_1$, as indicated at 266. The handover from beam A (210A) to beam B (220A) is thus delayed by time ($T_2$–$T_1$) seconds. In some examples, the handover by time delay may be performed if the optimized time value is estimated to be greater than the ideal time value. Further, the handover via time delay may be performed based on a pre-determined factor. The pre-determined factor may correspond to at least one of a time difference between the ideal time value or the optimized time value and an information pertaining to an active contact segment of at least one radio beam involved in the handover procedure. For example, in reference to scenario described in FIG. 2B, the handover from beam A (210A) to beam B (220A) can be delayed to Time $T_2$, based on pre-determined factor i.e. If ($T_2$–$T_1$)<T (pre-defined threshold as explained hereinabove) and the beam A (210B) has an active contact segment at Time $T_2$. Thus, the scheduled handover of the terminal within beam B (220B) at time $T_2$ (from segment $B_1$ to $B_2$) and associated signaling can be avoided.

In an alternate example, the scheduled handover may involve one or more consecutive handovers between the plurality of radio beams. In examples wherein when the scheduled handover involves multiple such consecutive handovers involving one or more intermediate beams between the source beam and the target beam, the system may facilitate to reduce the number of the beam handovers by performing direct handover from the source beam to the target beam without the need to execute the handover to the intermediate beam.

In an example, FIG. 2C may depict a third scenario involving multiple consecutive handovers. In this example, the system and method described herein may reduce the number of the beam handovers by performing direct handover from the source beam to the target beam without the need to execute the handover to an intermediate beam. As depicted in FIG. 2C, the terminal or user terminal (UT) 110 may be obtain signal connectivity from a satellite based on a source beam 210C. The scheduled handover herein may involve multiple consecutive handovers between plurality of the radio beams i.e. between the source beam including a first radio beam (e.g., source beam 210C), the intermediate beam including a second radio beam (220C) and the target beam including a third radio beam (270C). In a typical or conventional scenario, the multiple consecutive handovers may include a first consecutive handover from beam A (210C) to beam B (220C), followed by a second consecutive handover from the beam B (220C) to the beam C (270C). However, the system and method described herein may facilitate the handover procedure at an optimized time value to allow direct handover from the beam A (210C) to the beam C (270C). In some examples, the system/processor may receive an input data from a path selection algorithm/predictive algorithm, which may be used to evaluate the ideal time value ($T_1$ and $T_2$). The ideal time value ($T_1$) may pertain to the pre-defined time instance at which the scheduled handover from beam A (210C) to an intermediate beam B (220C) is expected to take place. The ideal time value ($T_2$) may pertain to the pre-defined time instance at which the scheduled handover from the intermediate beam B (220C) to a target beam C (270C) is expected to take place. This means that typically, the terminal 110 should be switched from beam A (210B) to beam B (220B) at ideal handover time value $T_1$ (as shown in 230B) and from beam B (220B) to beam C (270C) at ideal time $T_2$. Thus, in conventional systems and methods, the handover described in this example may include total 2 handovers. However, using the systems and methods described herein, there is no need to execute two consecutive handovers. This is achieved by a direct handover from the beam A (210B) to beam C (270C) without the need to execute the handover to the intermediate beam B (220C). This means that the system may estimate an optimized time value $T_3$ such that an optimized beam handover is performed at $T_3$ instead of performing the handover at the ideal handover time value $T_1$ and $T_2$, as indicated at 240C. In some examples, the direct handover may be performed based on a pre-determined factor. The pre-determined factor may correspond to at least one of a time difference between the ideal time value or the optimized time value and an information pertaining to an active contact segment of at least one radio beam involved in the handover procedure. For example, in reference to scenario described in FIG. 2B, the direct handover from beam A (210C) to beam C (270C) can performed at Time $T_3$, based on pre-determined factor i.e. If ($T_2$–$T_1$)<T (pre-defined threshold as explained hereinabove) and the beam A (210C) overlaps with Beam C at $T_3$ such that ($T_1$<$T_3$<$T_2$). Thus, the beam handover of the terminal from beam A (210C) to beam B (220C) and associated signaling can be avoided. It should be appreciated that additional frequency handovers may be present in one or more of the beams involved in this scenario. Provided all of the handovers fall within the time threshold T, all the intervening handovers may be skipped and only the last one executed The scenarios described herein in FIGS. 2A and 2B thus involve scheduled handovers between 2 beams in a same orbital plane as shown in 202A and 202B respectively of FIGS. 2A and 2B. These two scenarios conventionally may perform the scheduled handover resulting from a frequency change (within a beam when a gateway is communicating with the satellite) or feeder link handover (resulting from the change in the gateway communicating with the satellite). These handovers may pertain to a satellite beam crossing a specific point on earth, which impose resource constraints, which are fixed in time and hence must be executed for all user terminals in that beam at that instant. In case of example scenario described in FIG. 2C, the beams are in different orbital planes as shown in 202C, wherein beams A and B are in the same plane and beam C is in a different orbital plane. Therefore, when there are satellites from multiple orbital planes providing coverage for a particular terminal, the beams may not be necessarily in a fixed phase relationship with each other and thus handovers to some beams may be skipped (as performed by the system and method) in determining the best beams to perform handover, while maintaining good signal level and connectivity.

Figure 3:
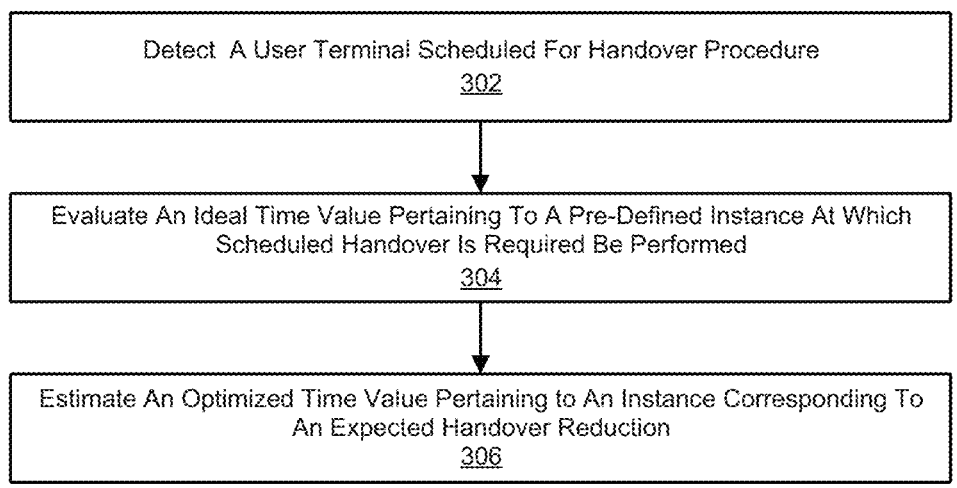
FIG. 3 illustrates a method for facilitating handover reduction in a satellite system, according to an example.

FIG. 3 illustrates a method 300 for facilitating handover reduction in a satellite system, according to an example. The method 300 is provided by way of example, as there may be a variety of ways to carry out the method described herein. Although the method 300 is primarily described as being performed by the system 100 of FIG. 1, the method 300 may be executed or otherwise performed by one or more processing components of another system or a combination of systems. Each block shown in FIG. 3 may further represent one or more processes, methods, or subroutines, and one or more of the blocks may include machine readable instructions stored on a non-transitory computer readable medium and executed by a processor or other type of processing circuit to perform one or more operations described herein. The system 100, for example, may assess the need for handover based on input data received continuously or at predetermined regular intervals during normal system operations. In some examples, this may be an automated sequence of actions, as described below and shown in FIG. 3.

At 302, the method may include detection of a user terminal (from a plurality of user terminals) that may be selected for a handover procedure for maintaining signal connectivity to a radio beam of a plurality of radio beams corresponding to at least one satellite. The handover procedure may facilitate to switch the signal connectivity of the user terminal from a source beam to a target beam of the plurality of radio beams. At 304, an ideal time value is evaluated based on input data. The ideal time value may pertain to pre-defined time instance at which a predicted handover is required to be performed. In some examples, the scheduled handover may correspond to at least one of, a scheduled frequency handover within same beam ora scheduled feeder link handover within the same beam due to a change in the gateway communicating with the satellite. At 306, an optimized time value may be estimated based on the evaluation and the input data. The optimized time value may pertain to an optimized time instance associated with an expected handover reduction. In an example, the expected handover reduction may lead to an estimated decrease in number of handovers in the handover procedure such that the expected handover reduction at the optimized time instance executes an optimized beam handover without the need to execute the scheduled handover. In some examples, the input data may be received prior to an upcoming scheduled handover to facilitate the handover procedure at the optimized time value to reduce the number of handovers. In some examples, to achieve the expected handover reduction system, the handover procedure may be performed based on a pre-determined factor such that the handover procedure can involve at least one of a time advancement or a time delay with respect to the pre-defined time instance at which the predicted handover is required to be performed. In an example, when the predicted handover involves a first consecutive handover from a first radio beam to a second radio beam of the plurality of the radio beams, followed by a second consecutive handover from the second beam to a third radio beam, the handover procedure may be facilitated at the optimized time value to allow direct handover from the first beam to the third beam.

Figure 4:
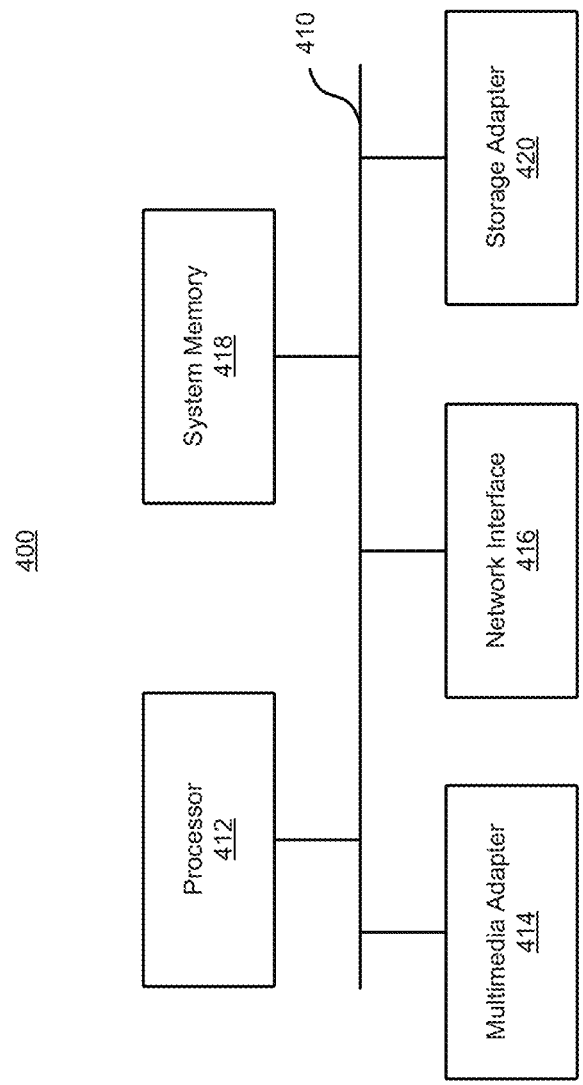
FIG. 4 illustrates a block diagram of a computer system for facilitating handover reduction in a satellite system, according to an example.

FIG. 4 illustrates a block diagram of a computer system for facilitating handover reduction in a satellite system, according to an example. The computer system 400 may be part of or any one of the terminals 110, the gateway 130, the network data center 140, the network management system (NMS) 150, the business system 160, as shown in system 100-1 and/or 200 to perform the functions and features described herein. The computer system 400 may include, among other things, an interconnect 410, a processor 412, a multimedia adapter 414, a network interface 416, a system memory 418, and a storage adapter 420.

The interconnect 410 may interconnect various subsystems, elements, and/or components of the computer system 400. As shown, the interconnect 410 may be an abstraction that may represent any one or more separate physical buses, point-to-point connections, or both, connected by appropriate bridges, adapters, or controllers. In some examples, the interconnect 410 may include a system bus, a peripheral component interconnect (PCI) bus or PCI-Express bus, a HyperTransport or industry standard architecture (ISA)) bus, a small computer system interface (SCSI) bus, a universal serial bus (USB), IIC (I2C) bus, or an Institute of Electrical and Electronics Engineers (IEEE) standard 1394 bus, or "firewire," or other similar interconnection element.

In some examples, the interconnect 410 may allow data communication between the processor 412 and system memory 418, which may include read-only memory (ROM) or flash memory (neither shown), and random access memory (RAM) (not shown). It should be appreciated that the RAM may be the main memory into which an operating system and various application programs may be loaded. The ROM or flash memory may contain, among other code, the Basic Input-Output system (BIOS), which controls basic hardware operation such as the interaction with one or more peripheral components.

The processor 412 may be the central processing unit (CPU) of the computing device and may control overall operation of the computing device. In some examples, the processor 412 may accomplish this by executing software or firmware stored in system memory 418 or other data via the storage adapter 420. The processor 412 may be, or may include, one or more programmable general-purpose or special-purpose microprocessors, digital signal processors (DSPs), programmable controllers, application specific integrated circuits (ASICs), programmable logic device (PLDs), trust platform modules (TPMs), field-programmable gate arrays (FPGAs), other processing circuits, or a combination of these and other devices.

The multimedia adapter 414 may connect to various multimedia elements or peripherals. These may include a devices associated with visual (e.g., video card or display), audio (e.g., sound card or speakers), and/or various input/output interfaces (e.g., mouse, keyboard, touchscreen).

The network interface 416 may provide the computing device with an ability to communicate with a variety of remove devices over a network (e.g., private network 170 or public network 180 of FIG. 1) and may include, for example, an Ethernet adapter, a Fiber Channel adapter, and/or other wired- or wireless-enabled adapter. The network interface 416 may provide a direct or indirect connection from one network element to another, and facilitate communication and between various network elements.

The storage adapter 420 may connect to a standard computer-readable medium for storage and/or retrieval of information, such as a fixed disk drive (internal or external).

Many other devices, components, elements, or subsystems (not shown) may be connected in a similar manner to the interconnect 410 or via a network (e.g., private network 170 or public network 180 of FIG. 1). Conversely, all of the devices shown in FIG. 4 need not be present to practice the systems and methods described herein. The devices and subsystems can be interconnected in different ways from that shown in FIG. 4. Code or computer-readable instructions to implement the dynamic approaches for payment gateway selection and payment transaction processing of the system 400 may be stored in computer-readable storage media such as one or more of system memory 418 or other storage. Code or computer-readable instructions to implement the dynamic approaches for payment gateway selection and payment transaction processing of the system 400 may also be received via one or more interfaces and stored in memory. The operating system provided on computer system 400 may be MS-DOS®, MS-WINDOWS®, OS/2®, OS X®, IOS®, ANDROID®, UNIX®, Linux®, or another operating system.

As mentioned above, what is shown and described with respect to the systems and methods above are illustrative. While examples described herein are directed to configurations as shown, it should be appreciated that any of the components described or mentioned herein may be altered, changed, replaced, or modified, in size, shape, and numbers, or material, depending on application or use case, and adjusted for handover reduction in satellite communication systems.

It should be appreciated that the systems and methods described herein may facilitate to enhance link performance in satellite systems. It should also be appreciated that the systems and methods, as described herein, may also include or communicate with other components not shown. For example, these may include external processors, counters, analyzers, computing devices, and other measuring devices or systems.

Moreover, single components may be provided as multiple components, and vice versa, to perform the functions and features described herein. It should be appreciated that the components of the system described herein may operate in partial or full capacity, or it may be removed entirely. It should also be appreciated that analytics and processing techniques described herein with respect to the optical measurements, for example, may also be performed partially or in full by other various components of the overall system.

It should be appreciated that data stores may also be provided to the apparatuses, systems, and methods described herein, and may include volatile and/or nonvolatile data storage that may store data and software or firmware including machine-readable instructions. The software or firmware may include subroutines or applications that perform the functions of the measurement system and/or run one or more application that utilize data from the measurement or other communicatively coupled system.

The various components, circuits, elements, components, and interfaces, may be any number of mechanical, electrical, hardware, network, or software components, circuits, elements, and interfaces that serves to facilitate communication, exchange, and analysis data between any number of or combination of equipment, protocol layers, or applications. For example, the components described herein may each include a network or communication interface to communicate with other servers, devices, components or network elements via a network or other communication protocol.

Although examples are directed to satellite communication systems, such as transponder satellite systems, it should be appreciated that the systems and methods described herein may also be used in other various systems and other implementations. For example, these may include other various telecommunication test and measurement systems. In fact, there may be numerous applications in cable or optical communication networks, not to mention fiber sensor systems that could employ the systems and methods as well.

By leveraging existing customer terminals, the system and methods described herein may provide efficient processing techniques and a cost-effective approach that may be readily integrated into various and existing network equipment. The systems and methods described herein may provide mechanical simplicity and adaptability to small or large satellite communication systems. Ultimately, the systems and methods described herein may increase efficiency, reduce cost, maximize existing equipment, minimize adverse effects of traditional systems, and improve link performance.

What has been described and illustrated herein are examples of the systems and methods along with some variations. The terms, descriptions, and figures used herein are set forth by way of illustration only and are not meant as limitations. Many variations are possible within the scope of the systems and methods described herein, which are intended to be defined by the following claims—and their equivalents—in which all terms are meant in their broadest reasonable sense unless otherwise indicated.

The invention claimed is:

1. A system, comprising:
a processor; and
a memory storing instructions, which when executed by the processor, cause the processor to:
detect, from a plurality of user terminals, a user terminal that is selected for a handover procedure for maintaining signal connectivity to a radio beam of a plurality of radio beams corresponding to at least one satellite, wherein the handover procedure facilitates to switch the signal connectivity of the user terminal from a source beam to a target beam of the plurality of radio beams;
evaluate, based on input data, an ideal time value pertaining to a pre-defined time instance at which a scheduled handover is to be performed, wherein the scheduled handover corresponds to at least one of a scheduled change in operating frequency within same beam or a scheduled feeder link handover due to a change in gateway communicating with the satellite; and
estimate, based on the evaluation and the input data, an optimized time value that pertains to an optimized time instance associated with an expected handover reduction, wherein the expected handover reduction leads to an estimated decrease in the number of handovers in the handover procedure such that the expected handover reduction at the optimized time instance executes an optimized beam handover without a need to execute the scheduled frequency or feeder link handover.

2. The system of claim 1, wherein the source beam and the target beam pertain to same or different satellite, and wherein the input data includes a known information pertaining to the available radio beams of the plurality of radio beams for maintaining the signal connectivity of the user terminal, and wherein the input data comprises at least one of a real time information and a pre-stored information.

3. The system of claim 2, wherein the system receives input data prior to an upcoming scheduled handover to facilitate the handover procedure at the optimized time value to reduce the number of handovers.

4. The system of claim 1, wherein the input data pertains to at least one of an ideal time value pertaining to the scheduled handover, information pertaining to the frequency handover, information pertaining to the beam handover, pre-determined strength of the signal connectivity at the user terminal, or availability of the plurality of radio beams.

5. The system of claim 1, wherein to achieve the optimized beam handover pertaining to the expected handover reduction, the system, based on a pre-determined factor, performs the handover procedure involving at least one of a time advancement or a time delay with respect to the pre-defined time instance at which a predicted handover is required to be performed.

6. The system of claim 5, wherein the system performs the handover procedure by the time advancement with respect to the pre-defined time instance, if the optimized time value is estimated to be less than the ideal time value.

7. The system of claim 5, wherein the system performs the handover procedure by the time delay with respect to the pre-defined time instance, if the optimized time value is estimated to be greater than the ideal time value.

8. The system of claim 5, the pre-determined factor corresponds to at least one of a time difference between the ideal time value or the optimized time value and an information pertaining to an active contact segment of at least one radio beam involved in the handover procedure.

9. The system of claim 8, wherein the pre-determined factor is satisfied if the time difference between the ideal time value and the optimized time value exceeds a pre-defined threshold value, and expected handover reduction is not performed if the time difference between the ideal time value and the optimized time value does not exceed a pre-defined threshold value.

10. The system of claim 9, wherein the pre-defined threshold value pertains to lowest time value required for a signal to noise ratio (SNR) of the radio beam to drop by a configurable threshold.

11. The system of claim 10, wherein the configurable threshold corresponds to an expected tradeoff between a total processing time for one handover and temporary degradation in the SNR, based on requirements and characteristics of the scheduled handover.

12. The system of claim 8, wherein the information pertaining to the radio beam includes an estimated active contact segment of source beam or the target beam involved in the handover procedure at the time of execution of the handover procedure.

13. The system of claim 1, wherein the source beam and the target beam involved in the handover procedure correspond to the at least one of same orbital plane or a different orbital plane, and wherein the scheduled handover involves one or more consecutive handovers between the plurality of radio beams.

14. The system of claim 13, wherein when the scheduled handover involves multiple consecutive handovers involving one or more intermediate beams between the source beam and the target beam, the system facilitates to reduce the number of the beam handovers by performing direct handover from the source beam to the target beam without the need to execute the handover to the intermediate beam.

15. The system of claim 14, wherein the scheduled handover involves the multiple consecutive handovers between the source beam including a first radio beam, the intermediate beam including a second radio beam and the target beam including a third radio beam of the plurality of the radio beams, and wherein when the consecutive handovers include a first consecutive handover from the first radio beam to the second radio beam, followed by a second consecutive handover from the second beam to the third radio beam, the system facilitates the handover procedure at the optimized time value to allow direct handover from the first beam to the third beam.

16. A method for facilitating handover reduction, comprising:
    detecting, by a processor, from a plurality of user terminals, a user terminal that is scheduled for a handover procedure for maintaining signal connectivity to a radio beam of a plurality of radio beams corresponding to at least one satellite, wherein the handover procedure facilitates to switch the signal connectivity of the user terminal from a source beam to a target beam of the plurality of radio beams;
    evaluating, by the processor, based on input data, an ideal time value pertaining to a pre-defined time instance at which a scheduled handover is to be performed, wherein the scheduled handover corresponds to at least one of a scheduled change in operating frequency within same beam or a scheduled feeder link handover due to a change in gateway communicating with the satellite; and
    estimating, by the processor, based on the evaluation and the input data, an optimized time value that pertains to an optimized time instance associated with an expected handover reduction, wherein the expected handover reduction leads to an estimated decrease in the number of handovers in the handover procedure such that the expected handover reduction at the optimized time instance executes an optimized beam handover without a need to execute the scheduled handover.

17. The method of claim 16, wherein the method comprises receiving the input data prior to an upcoming scheduled handover to facilitate the handover procedure at the optimized time value to reduce the number of handovers.

18. The method of claim 16, wherein to achieve the expected handover reduction system, the method comprises:
    performing, by the processor, based on a pre-determined factor, the handover procedure involving at least one of a time advancement or a time delay with respect to the pre-defined time instance at which the scheduled handover is required to be performed.

19. The method of claim 16, wherein when the scheduled handover involves a first consecutive handover from a first radio beam to a second radio beam of the plurality of the radio beams, followed by a second consecutive handover from the second beam to a third radio beam, the method comprises:
    facilitating, by the processor, the handover procedure at the optimized time value to allow direct handover from the first beam to the third beam.

20. A non-transitory computer-readable storage medium having an executable stored thereon, which, when executed, instructs a processor to perform a method as follows:
    detecting, from a plurality of user terminals, a user terminal that is selected for a handover procedure for maintaining signal connectivity to a radio beam of a plurality of radio beams corresponding to at least one satellite, wherein the handover procedure facilitates to switch the signal connectivity of the user terminal from a source beam to a target beam of the plurality of radio beams;

evaluating, based on input data, an ideal time value pertaining to a pre-defined time instance at which a scheduled handover is to be performed, wherein the scheduled handover corresponds to at least one of a scheduled change in operating frequency within same beam or a scheduled feeder link handover due to a change in gateway communicating with the satellite; and estimating, based on the evaluation and the input data, an optimized time value that pertains to an optimized time instance associated with an expected handover reduction, wherein the expected handover reduction leads to an estimated decrease in the number of handovers in the handover procedure such that the expected handover reduction at the optimized time instance executes an optimized beam handover without a need to execute the scheduled frequency or feeder link handover.

* * * * *